United States Patent [19]

Oxendine

[11] 4,091,149
[45] May 23, 1978

[54] PAD FOR VEHICLE HAVING FLAT BED

[76] Inventor: Ozmer Lee Oxendine, Rte. 3, Box 083-A, Maxton, N.C. 28364

[21] Appl. No.: 715,578

[22] Filed: Aug. 18, 1976

[51] Int. Cl.² .............................................. F16B 5/02
[52] U.S. Cl. ...................................... 428/33; 428/81; 428/82; 428/94; 428/95; 428/542; 428/315; 428/316; 428/174
[58] Field of Search ..................... 428/81, 82, 94, 95, 428/542, 33

[56] References Cited

U.S. PATENT DOCUMENTS

| | | | |
|---|---|---|---|
| 2,167,195 | 7/1939 | Ash | 428/81 X |
| 2,296,502 | 9/1942 | Cotterman | 428/95 X |
| 3,669,817 | 6/1972 | McDevitt | 428/82 |
| 3,973,720 | 8/1976 | Schmid | 428/542 X |

Primary Examiner—P. C. Ives
Attorney, Agent, or Firm—B. B. Olive

[57] ABSTRACT

Disclosed is a composite pad construction adapted to overlie the bed of a flatbed vehicle. In a preferred embodiment, the pad is formed from two pieces which may be fitted together to form a substantially rectangular construction that is custom fit to the bed. The pad comprises a substantially rectangular base portion that has a recess along its longitudinal centerline and a central panel that fits into the recess. The central panel, when removed provides a walkway in the center of the pad. The base may be provided with lateral cutouts on the sides for accommodating wheel wells that may protrude into the bed area. Also, auxiliary panels may be provided which may fit into the recess or may be used as pillows.

1 Claim, 5 Drawing Figures

PAD FOR VEHICLE HAVING FLAT BED

BACKGROUND OF THE INVENTION

1. Field of the Invention

The invention relates to pad constructions and, in particular, to a pad construction for covering the bed of a flatbed vehicle.

2. Description of the Prior Art

It is well known that certain vehicles such as station wagons, vans and pickup trucks have flatbed portions which are normally utilized to carry cargo. Many such vehicles also serve as pleasure vehicles wherein the flatbeds are utilized for the transportation of passengers, especially children. The transformation of a flatbed vehicle from a work vehicle to a pleasure vehicle may take place several times a week. An inherent problem in these frequent changeovers is that the flatbed area usually becomes dirty during work hours and must be cleaned in order to satisfactorily accommodate passengers. Another problem is that the relatively hard beds may prove uncomfortable during a prolonged trip. It has been proposed to cover the bed portion with loose canvas, or the like, before loading passengers. However, such a solution has proven unsatisfactory since the canvas moves easily over the bed and quickly becomes covered with dirt. The canvas adds little in the way of comfort to the passengers.

It is an object of the present invention to provide means for facilitating the changeover of a flatbed vehicle from a work vehicle to a pleasure vehicle. Another object of the invention is to provide a pad for flatbed vehicles that conforms to the size of the bed and is soft enough to lend comfort to the passengers. Yet another object is to provide a pad having a removable central panel which, when removed, provides a recess and walkway and which central panel can be used itself as a cushion or pillow on the pad.

SUMMARY OF THE INVENTION

The composite pad construction of the present invention comprises a base portion having a rectangular outline and having a recess formed therein for receiving a mating interfitting central panel. The base portion and central panel, when fitted together, form a substantially uninterrupted rectangular pad for overlying the bed of a flatbed vehicle. In a preferred embodiment, the base is provided with a central rectangular recess provided along the longitudinal centerline of the base such that when the mating central panel is removed from this recess, a central walkway over the bed is formed. The base also has a pair of lateral cutouts along the sidewalls thereof which may accommodate the vehicle wheel wells. A pair of auxiliary panels which may fit into the recess or serve as pillows are also provided.

DESCRIPTION OF THE PREFERRED EMBODIMENT

Figure 1:
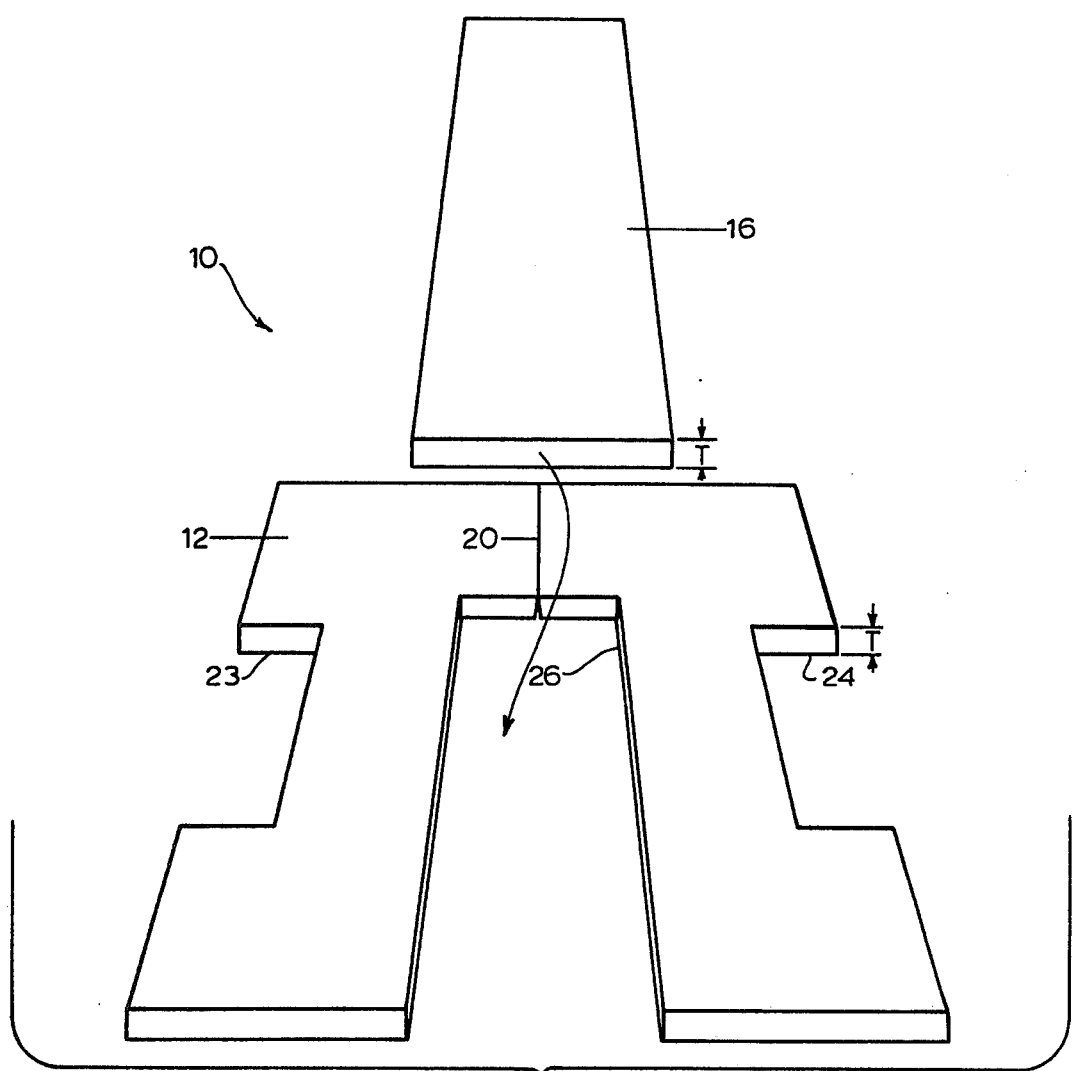
FIG. 1 is an exploded perspective view of the preferred embodiment of the pad of the present invention and showing the central panel.

Referring to the drawings and particularly to FIG. 1, there is illustrated a two-piece pad construction 10 which is adapted for being placed overlying the bed of a flatbed vehicle such as a station wagon, van or pickup truck. Pad 10 includes a base portion 12 and a removable central panel 16. Base 12 has a cutout recess 26 which has substantially the same dimensions as the panel 16. Of course, the recess 26 may be made somewhat larger than panel 16 in order to enable the panel to easily slide into the recess. The exact size of the recess will depend upon the desired tightness of the fit, taking into account the material used for the pad, the thickness of the pad, etc. Panel 16 and its respective mating recess 26 may have a width on the order of one to four feet with one and one-half feet being preferable. The length of panel 16 and recess 26 should be at least one-half the length of the pad and for reasons stated below, should not exceed the width of the pad.

Figure 2:
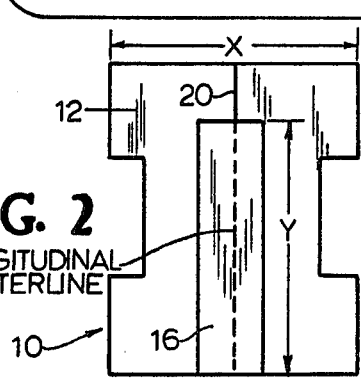
FIG. 2 is a plan view of the pad illustrated in FIG. 1 with the removable central panel positioned within its respective mating recess to form a substantially uninterrupted pad over the vehicle bed.

Base 12 is preferably custom designed to fit over the vehicle bed for which it is intended. To this end, the illustrated pad 10 has a pair of cutouts at the side of the base 12 to accommodate the wheel wells (not shown) which protrude into the bed area. As illustrated in FIGS. 1 and 2, the front portion of base 12 has a central seam or hinge 20 that allows the pad to be more easily folded over itself for insertion into and removal from the bed area.

In the preferred embodiment, the bottom and side surfaces of the pad are made from a conventional vinyl material while the top surface is formed from pile carpet material. In an alternative construction all of the outer surfaces of the pad may be made from vinyl or other suitable pliable materials. A suitable cushioning material (for example, foam rubber) is placed within the pad and is chosen according to the relative softness desired. The thickness of the pad may vary according to the intended use. In the illustrated embodiment, the thickness is on the order of three inches, with one to six inches being an acceptable range.

FIG. 2 illustrates a first operative arrangement of the pad 10 wherein the removable panel 16 is positioned within its respective mating recess 26 in base 12 to form a substantially uninterrupted pad. The central panel 16 remains within its mating recess 26 to provide a continuous pad surface for sleeping or other times when little walking over the bed is contemplated.

Figure 3:
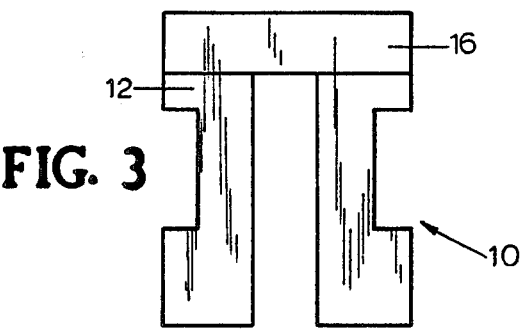
FIG. 3 is a plan view of the pad shown in FIGS. 1 and 2 with the central panel removed to facilitate passenger movement over the bed area and with the removed panel placed at the front of the pad for use as a pillow.

FIG. 3 illustrates a second operative arrangement of the pad 10 wherein the central panel 16 is removed from its respective recess 26 and is placed laterally across the front of the pad 10 for use as a pillow or backrest. The removal of central panel 16 exposes an area of the bed which may be utilized as a walkway.

Figure 4:
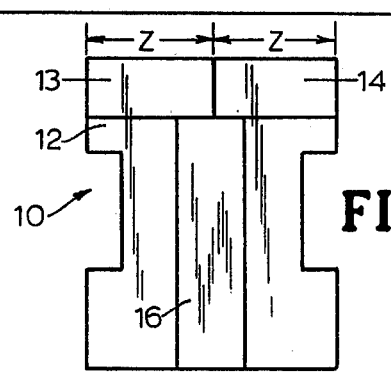
FIG. 4 is a plan view of the pad with the panel in its recess and with a pair of auxiliary pillow members placed at the front of the pad.

FIG. 4 illustrates a four-piece pad construction which includes a pair of auxiliary pillow members 13, 14 placed laterally across the front of pad 10. Members 13, 14 are made from the same materials as base 10 and panel 16 and are one-half the length of panel 16. Members 13, 14 are the same width as recess 26 and panel 16 so that one may be placed in recess 26 to partially fill the recess while leaving the remainder of the recess area exposed to the bed surface for the transportation of a cooler, or the like. Alternatively, both auxiliary panel members 13, 14 may be used to fill recess 26 while central panel 16 is used as shown in FIG. 3. In an alternative embodiment, not shown, three pillow members are provided with one member being adapted to fill one-half of recess 26 and the other two being of equal size and adapted to fill the other one-half.

The relative dimensions of the pad are preferably as shown in FIGS. 2 and 4 where $X=Y=2Z$. Thus, when either the central panel 16 or both members 13, 14 are placed across the front of the pad, they will substantially cover the front pad laterally without overlapping. Thickness T is uniform for the pad and panels.

Figure 5:
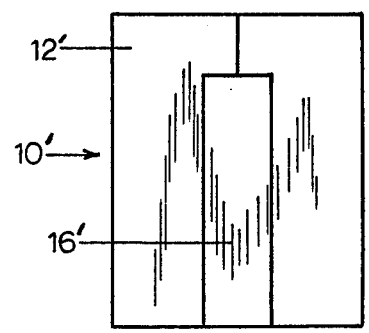
FIG. 5 is a plan view of an alternative pad construction having a single removable panel and no wheel well cutouts.

FIG. 5 represents an alternative pad construction 10' which has only one removable panel 16'. This construction is useful in vehicles having a bed which is substantially uninterrupted by wheel wells. Central panel 16' may be removed to form a walkway and may be placed across the front portion of the pad as was illustrated with reference to FIG. 3.

While the central panel 16 is referred to as being "substantially rectangular", it should be pointed out that the panel may have other shapes. In fact, it is contemplated that the central panel and its respective recess may have a rounded forward end in some instances.

It should be noted that the pad 10 illustrated in FIGS. 1-4 is adapted to overlie the bed of a pickup with the recess 26 extending forward from the edge of the pad abutting the tailgate. A pad of similar construction, when placed in a conventional van, would preferably have the recess extending rearwardly from the forward edge of the pad because access to the van bed area is generally from the front passenger compartment.

In summary, the art is now provided with a novel pad construction useful for covering the bed of flatbed vehicles with the pad having a removable panel for providing a walkway and side cutouts where necessary to accommodate the wheel wells which may protrude into the bed area, and with useful auxiliary panels or pillow members.

What is claimed is:

1. A flat, composite pad construction adapted for overlying substantially the entire rectangular bed surface of a flatbed vehicle and having a pliable cover with top, side and bottom surfaces encasing a filler material, said pad comprising a base portion foldable in hinge fashion along a longitudinal centerline and with an outline substantially conforming to the perimeter of the bed surface, said base portion having a substantially rectangular central recess extending from one marginal edge portion along said longitudinal centerline of said pad for a distance equal to the width of said pad and having a pair of cutouts along the sidewalls thereof for accommodating vehicle wheel wells protruding into the bed, and a central panel portion having substantially the same thickness as said base portion and having a width and length mating said central access whereby said central panel portion is adapted for placement longitudinally within said central recess to form a continuous pad covering the bed surface and for removal from said central recess to form a walkway over the bed surface along the longitudinal centerline of the pad and with the length of said panel portion being adapted to mate the width of said pad for employment as a pillow crosswise thereof.

* * * * *